(12) United States Patent
Theodos

(10) Patent No.: US 7,592,571 B2
(45) Date of Patent: Sep. 22, 2009

(54) ROTATING ELEMENT SEAL ASSEMBLY

(75) Inventor: Michael Andrew Theodos, Bossier City, LA (US)

(73) Assignee: Frymaster L.L.C., Shreveport, LA (US)

(*) Notice: Subject to any disclaimer, the term of this patent is extended or adjusted under 35 U.S.C. 154(b) by 415 days.

(21) Appl. No.: 11/238,694

(22) Filed: Sep. 29, 2005

(65) Prior Publication Data

US 2007/0069481 A1 Mar. 29, 2007

(51) Int. Cl.
*H05B 3/04* (2006.01)
*F24H 1/20* (2006.01)
*F16J 15/32* (2006.01)

(52) U.S. Cl. .................. 219/437; 219/430; 219/439; 219/536; 392/501; 277/590

(58) Field of Classification Search .................. None
See application file for complete search history.

(56) References Cited

U.S. PATENT DOCUMENTS

| | | | | |
|---|---|---|---|---|
| 2,437,586 A | | 3/1948 | Aber ........................ 277/582 |
| 2,456,981 A | * | 12/1948 | Monath .................... 126/377.1 |
| 2,544,458 A | * | 3/1951 | Higgins ..................... 392/501 |
| 2,867,420 A | * | 1/1959 | Potts ......................... 219/430 |
| 3,105,893 A | * | 10/1963 | Finn .......................... 392/501 |
| 3,165,620 A | * | 1/1965 | Miller ........................ 219/204 |
| 3,735,990 A | * | 5/1973 | Steegmuller ................ 277/346 |
| 4,161,320 A | * | 7/1979 | Stucke ........................ 277/560 |
| 4,325,268 A | * | 4/1982 | Benteler et al. .............. 74/492 |
| 4,772,183 A | | 9/1988 | Durden ................... 417/423 R |
| 4,890,683 A | * | 1/1990 | Matsuda et al. ............. 180/444 |
| 5,139,274 A | * | 8/1992 | Oseman ...................... 277/552 |
| 5,371,831 A | | 12/1994 | Gauer et al. ................. 392/501 |
| 5,833,245 A | * | 11/1998 | Gallagher ................... 277/549 |
| 6,098,987 A | * | 8/2000 | McBride ..................... 277/436 |
| 6,302,402 B1 | * | 10/2001 | Rynders et al. ............. 277/530 |
| 6,363,836 B1 | | 4/2002 | Usherovich .................. 99/339 |
| 6,472,637 B2 | | 10/2002 | Ballem ....................... 219/205 |
| 6,815,642 B2 | * | 11/2004 | Haag et al. ................. 219/204 |
| 6,915,558 B2 | * | 7/2005 | Jin et al. .................... 29/602.1 |
| 7,019,261 B2 | * | 3/2006 | Worrell et al. .............. 219/204 |

OTHER PUBLICATIONS

International Search Report and Written Opinion dated Sep. 21, 2007 based on PCT application No. PCT/US06/37471.
Written Opinion dated Oct. 7, 2008 in the corresponding international application PCT/US2006/037471, "New Citations."

* cited by examiner

*Primary Examiner*—Joseph M Pelham
(74) *Attorney, Agent, or Firm*—Ohlandt, Greeley, Ruggiero & Perle, L.L.P.

(57) ABSTRACT

A seal assembly includes a mount that selectively rotates an element and a seal that prevents leakage of a liquid therethrough.

24 Claims, 6 Drawing Sheets

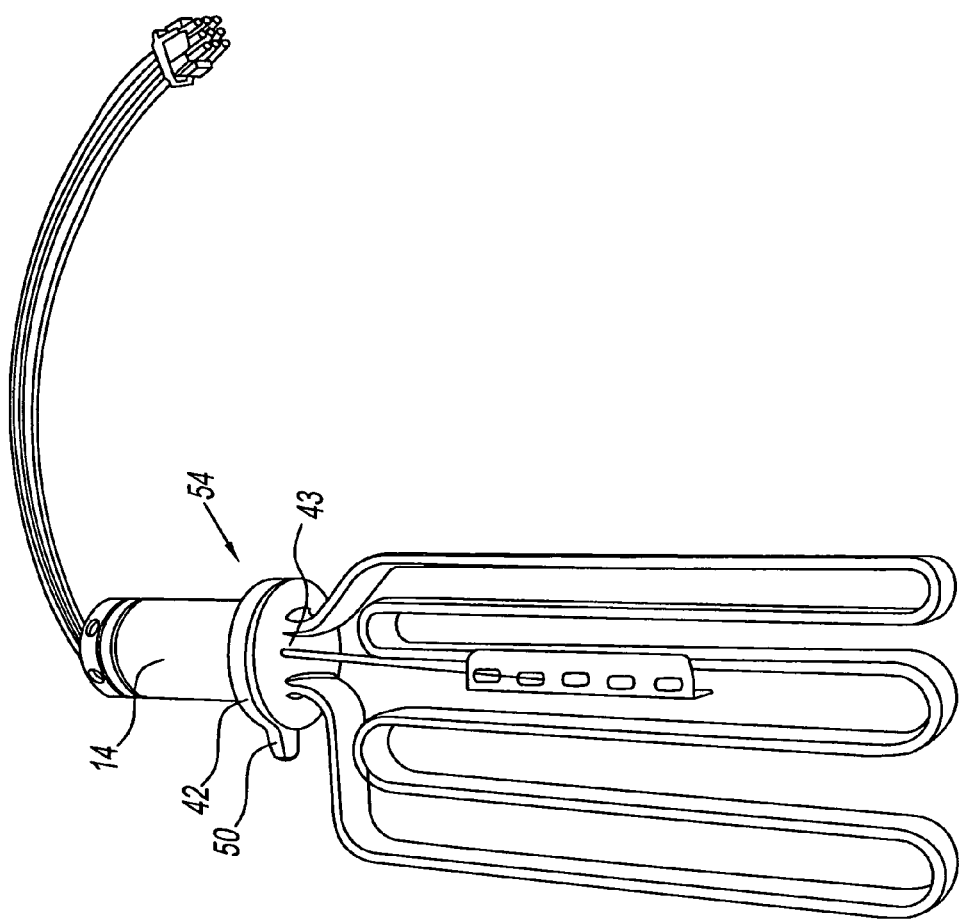
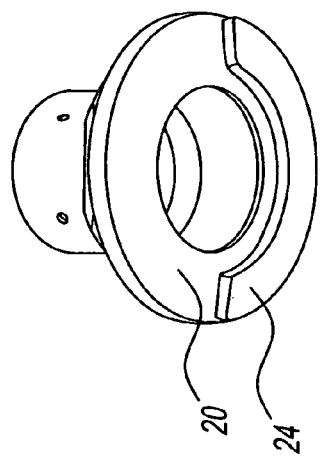
Fig. 5
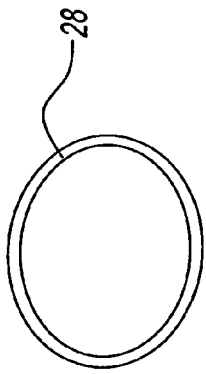
Fig. 6
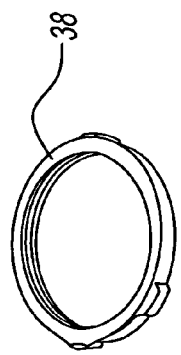
Fig. 7
Fig. 8

ROTATING ELEMENT SEAL ASSEMBLY

BACKGROUND OF THE INVENTION

1. Field of the Invention

This invention relates generally to a unique sealing assembly that selectively rotates an element and prevents leakage of a liquid therethrough. In one application, the seal assembly is used to rotate heating elements below the oil surface in an electric fryer without oil leakage through the seal assembly. The seal assembly may also be useful in other applications.

2. Description of the Related Art

Electric heating elements have been used extensively in the fryer industry for years. Current designs have elements with "hinge" portions affixed above the oil line or elements sealed under the oil level immovably affixed to a sidewall of a frypot. Elements with "hinge" portions are generally affixed above the oil line for movement of the elements out of the fryer pot or above the oil line in order to permit the user direct access to the pot for cleaning or maintenance. Most other fryer manufacturers have installed fryers having fixed elements extending through the frypot wall below or above the oil line with static seals. The seal is installed, for example via o-ring or gasket, to prevent leakage around the element where the element has pierced through the pot wall. Tilting the elements above the oil line by the "hinge" portion performs well when the elements are in the down position. However, when tilting the elements out of the cooking area for cleaning, openings are created which allow oil to undesirably enter the rear of the frypot cabinet. These areas are hard to clean which can create large buildups that are unsanitary. Moreover, fixed elements impede the user's access to some areas of the frypot such as those areas beneath the heating elements. Again, these areas are hard to clean which can create large buildups that are unsanitary.

Accordingly, there is a need for a seal assembly to selectively rotate an element which does not permit leakage of a liquid through the seal assembly.

It is an object of the present invention to provide a seal assembly that permits rotation of the element and prevents leakage of a liquid therethrough.

SUMMARY OF THE INVENTION

A seal assembly of the present invention comprises a mount that selectively rotates an element and a seal that prevents leakage of a liquid through the mount.

The mount, preferably, has a hub and a shaft. The hub can be affixable to a mounting surface. The shaft can be rotatably disposed in the hub. The hub can have a tubular portion and a mounting portion extending about a periphery of a first end of the tubular portion, and the shaft can have a cylindrical shaft extension disposed in the tubular portion and a ridge portion positioned at least partially adjacent to the mounting portion. The cylindrical portion, preferably, has a first end at least partially extends beyond the tubular portion with a snap ring that can be removably connected about the first end. The shaft can be connected to the element such that the element rotates with the shaft.

The seal is, preferably, a U-ring seal disposed intermediate the tubular portion and the cylindrical shaft extension and adjacent the ridge portion or any other conventional know seal that prevents a liquid from passing therethrough.

The seal assembly can further comprise a first bearing disposed adjacent the U-ring seal. The seal assembly can further comprise a second U-ring seal disposed intermediate the tubular portion and the cylindrical shaft within a third recess. The seal assembly can further comprise a second bearing disposed intermediate the tubular portion and the cylindrical shaft within the third recess adjacent to the second U-ring seal. The first and second bearings can provide thrust bearings centering the shaft in the hub and bearing surfaces during rotation of the shaft.

The seal assembly can further comprise a locknut removably secured about the tubular portion of the mount or any other conventionally known mechanism to secure the mount to a mounting surface.

In an alternative embodiment the seal assembly can be used to rotationally connect a heating element to a wall of a fryer. The fryer comprises a pot having an interior, a heating element disposed inside the interior, a mount that rotationally connects the heating element to a wall of the pot, and a seal that prevents leakage of an oil through the mount.

The fryer can further comprise a probe connected to the mount that controls an oil temperature. The probe can remain in a same relative position to the element during rotation.

The above-described and other features and advantages of the present disclosure will be appreciated and understood by those skilled in the art from the following detailed description, drawings, and appended claims.

BRIEF DESCRIPTION OF THE DRAWINGS

FIG. 5 is a top perspective view of a hub;

FIG. 6 is a top perspective view of an o-ring;

FIG. 7 is a top perspective view of a locknut;

FIG. 8 is a top perspective view of a shaft/element assembly;

DETAILED DESCRIPTION OF THE INVENTION

Figure 1:
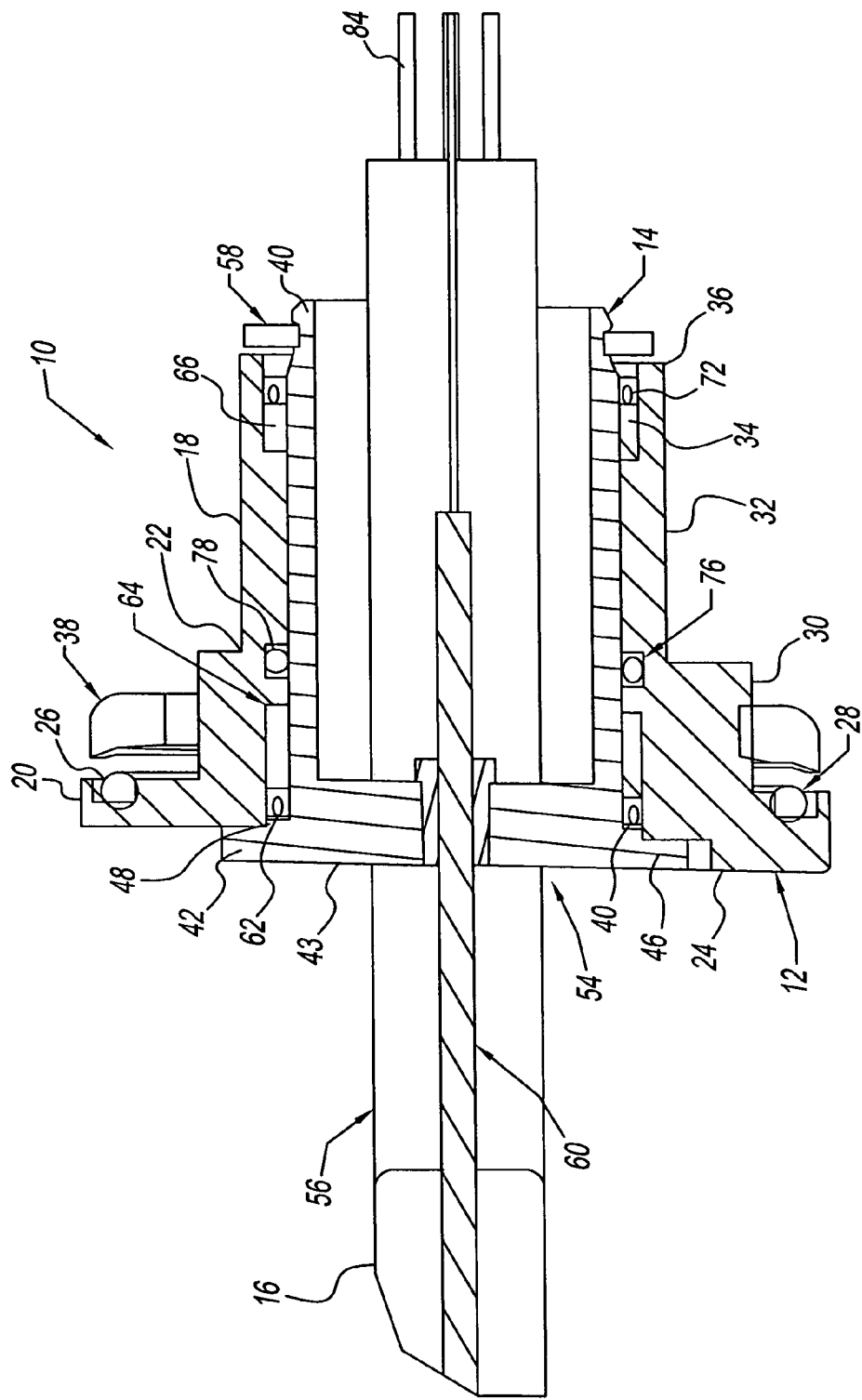
FIG. 1 is a side cross-sectional view of a seal assembly of the present invention.
Figure 2:
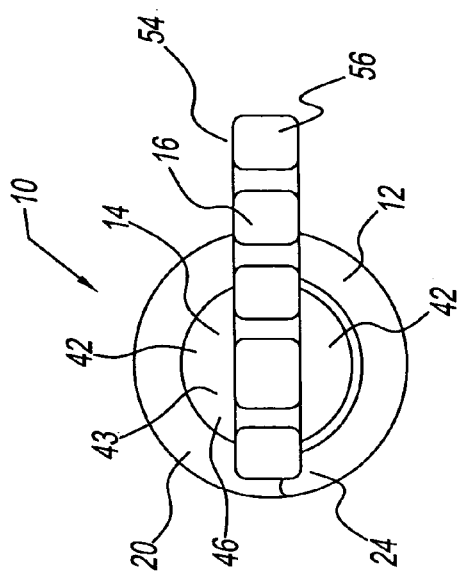
FIG. 2 is a front view of the seal assembly of FIG. 1.
Figure 3:
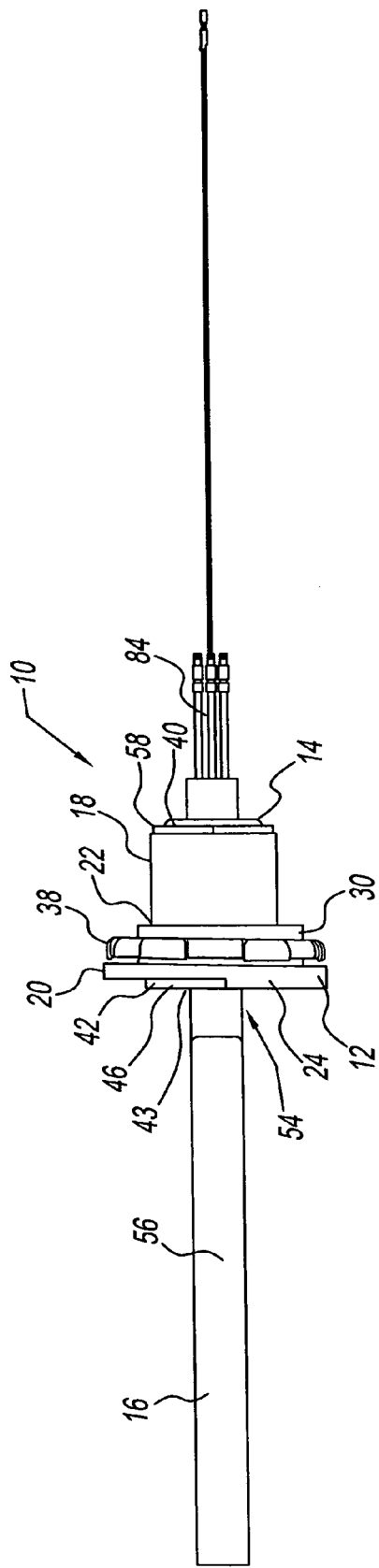
FIG. 3 is a side view of the seal assembly of FIG. 1.

Referring now to FIGS. 1 through 3, an exemplary embodiment of a unique sealing assembly generally referred to by reference numeral 10 is illustrated. Sealing assembly 10 may be used in fryers, such as, for example, electric fryers or other similar applications to provide a seal assembly that permits disposition of an element in a liquid allowing rotation of the element while preventing leakage around or through the sealing assembly.

In an exemplary embodiment, sealing assembly 10 has a hub 12 and a shaft 14. Hub 12 has a tubular portion 18 and a mounting portion 20 extending about the periphery of a first end 22 of tubular portion 18. Mounting portion 20 may have a first recess 26 in an inner surface facing away from tubular portion 18 to position a first o-ring 28. First o-ring/gasket 28 may be circular, as shown in FIG. 6, and, preferably, is made of resilient material such as, for example, rubber. First o-ring 28 seals liquid, such as for example, cooking oil, from leaking through sealing assembly 10. The particular type, including materials, dimensions and shape, of hub 12 can vary according to the particular needs of sealing assembly 10.

Figure 4:
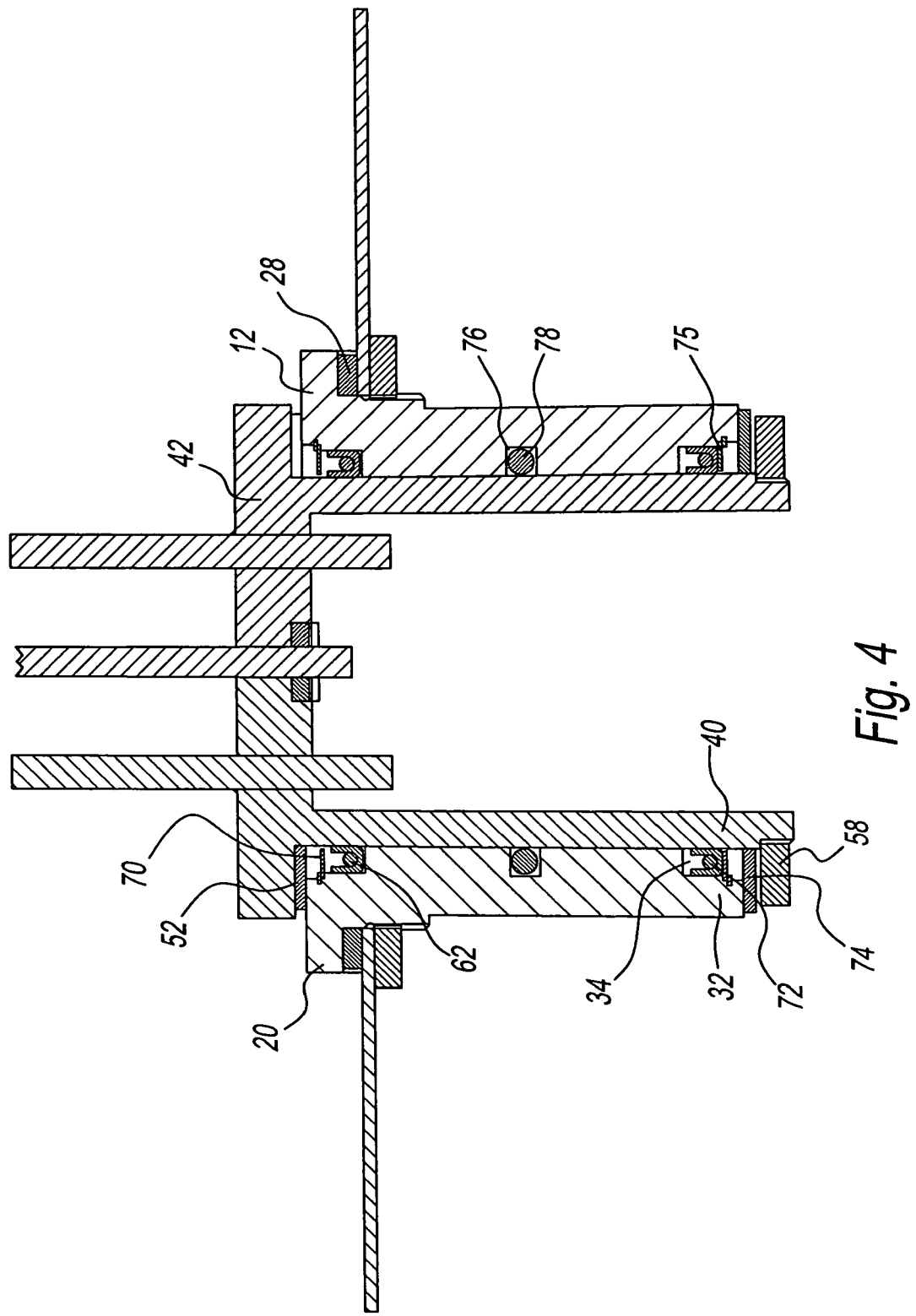
FIG. 4 is a side cross-sectional view of an alternative embodiment of a seal assembly of the present invention.

Alternatively, as shown in FIG. 4, first o-ring 28 may be an o-ring having flat surfaces.

Tubular portion 18, preferably, has a first tubular portion 30, a second tubular portion 32, and an interior surface having a second recess 34. Second recess 34, preferably, is positioned proximate a second end 36. Second tubular portion 32 has a diameter smaller than first tubular portion 30. Hub 12 may be secured in place on the mounting surface by a locknut 38. Locknut 38 extends about first tubular portion 30. In use, locknut 38, preferably, is connected to tubular portion 32 so that an inner surface opposite the outer surface of mounting portion 20 abuts against the mounting surface and tubular portion 18 extends through the mounting surface. Preferably, locknut 38 is a rigid conduit locknut, as shown in FIG. 7.

Shaft 14, preferably, has a shaft extension 40 and a ridge 42 extending from a first end 44 of shaft extension 40. Ridge 42 has a first ridge portion 46 and a second ridge portion 48 having a diameter smaller than first ridge portion 46. Shaft 14 is inserted through tubular portion 18 of hub 12 so that first ridge portion 46 abuts tubular portion 18. Shaft 12 is held in place by a snap ring 58. Shaft 14 may move back and forth a distance within hub 12, preferably, less than one tenth of an inch, while held in place. Snap ring 58 has a larger diameter than tubular portion 18 to prohibit shaft extension 40 from disengaging from hub 12. The particular type, including materials, dimensions and shape, of shaft 14 can vary according to the particular needs of sealing assembly 10.

An alternative embodiment, shown in FIG. 4, may have ridge 42 with a constant diameter and an additional o-ring/gasket 52 disposed intermediate ridge 42 and mounting portion 20.

A first U-ring 62 is disposed between shaft extension 40 and first tubular portion 30 such that second ridge portion 48 is adjacent to first U-ring 62 forming a first spring energized teflon or first U-ring seal. A first bearing 64 may be disposed between first U-ring 62 and tubular portion 18. The first U-ring seal prevents leakage through seal assembly 10. Moreover, the first U-ring seal allows shaft 14 to rotate while preventing leakage of liquid and acts as bushings for rotation. First U-ring 62 has clearances, tolerances, materials, and seal layout uniquely designed for this application to allow rotation and insure seal integrity for keeping liquid, for example oil, contained. Furthermore, dimensions are selected to insure an impermeable seal while allowing rotation of shaft 14. The first U-ring seal may be used for applications having a static seal to over 5000 rotations per minute along with a wide variation in temperatures from −200° Fahrenheit to over 600° Fahrenheit and pressures, for example, a vacuum to over 10,000 pounds per square inch gauge. Alternatively, any other conventionally known seal that prevents a liquid from passing therethrough may be used.

A second U-ring 72 may be may be positioned between second tubular portion 32 and shaft extension 40 in second recess 34 forming a second spring energized teflon or second U-ring seal. A second bearing 66 may be disposed between second U-ring 72 and tubular portion 18. Second U-ring seal 72 further prevents leakage through seal assembly 10. Moreover, second U-ring seal 72 allows shaft 14 to rotate while preventing leakage of liquid and acts as bushings for rotation. Second U-ring 72 has clearances, tolerances, materials, and seal layout uniquely designed for this application to allow rotation and insure seal integrity for keeping liquid, for example oil, contained. Furthermore, dimensions are selected to insure an impermeable seal while allowing rotation of shaft 14.

A second bearing 66 may be positioned between second tubular portion 32 and shaft extension 40 in second recess 34 adjacent second U-ring 72. First and second bearings 64 and 66 can be thrust bearings to center shaft 14 in hub 12 and provide bearing surfaces during rotation of shaft 14.

Referring to FIG. 4, alternatively, first U-ring 62 may be held in place by a first U-ring snap ring 70. Second U-ring seal 72 may be positioned between second tubular portion 32 and shaft extension 40 in second recess 34 via a second U-ring snap ring 75 and a third o-ring 74 may be disposed between snap ring 58 and shaft extension 40 to further assist in preventing leakage.

A surface facing shaft 14 of tubular portion 18 may have a third recess 76. Third recess 76 may have a second o-ring 78 disposed therein about shaft extension 40. Second o-ring 78 may provide a back-up seal to the first U-ring seal in the case of failure. Thus, sealing assembly 10 is uniquely assembled to allow rotation of shaft 14 while hub 12 remains in a fixed position.

Figure 9:
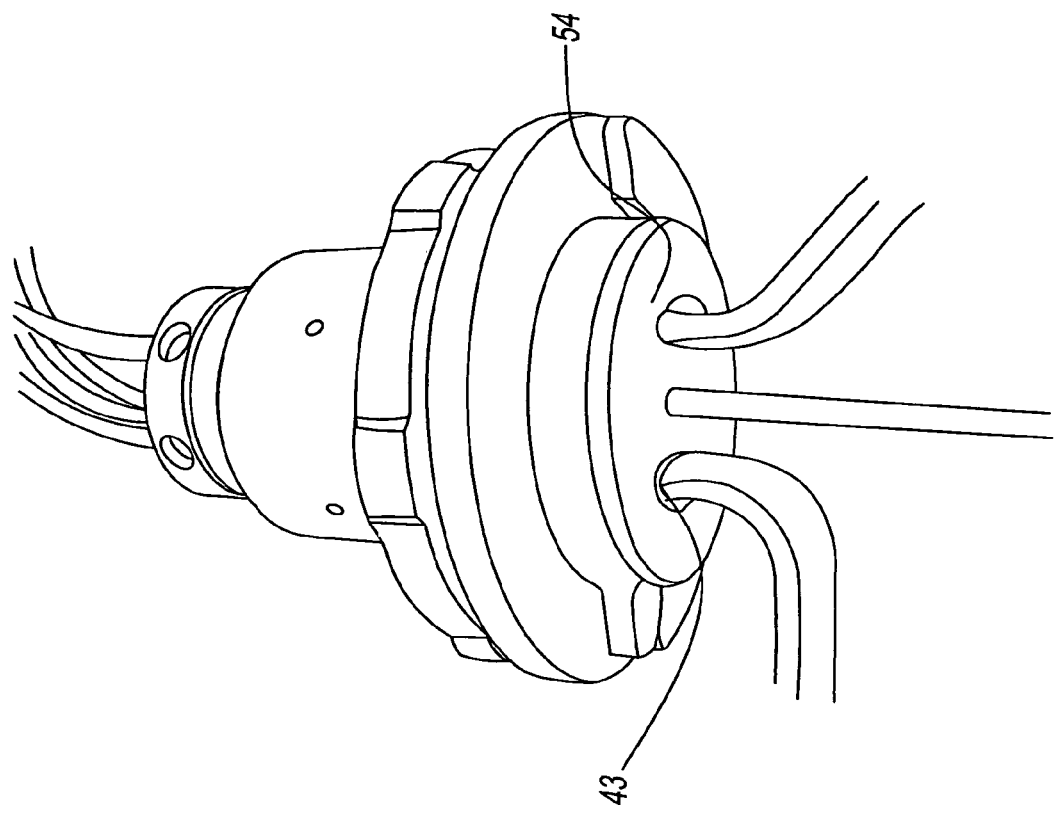
FIG. 9 is a top perspective view of the seal assembly of FIG. 1.
Figure 10:
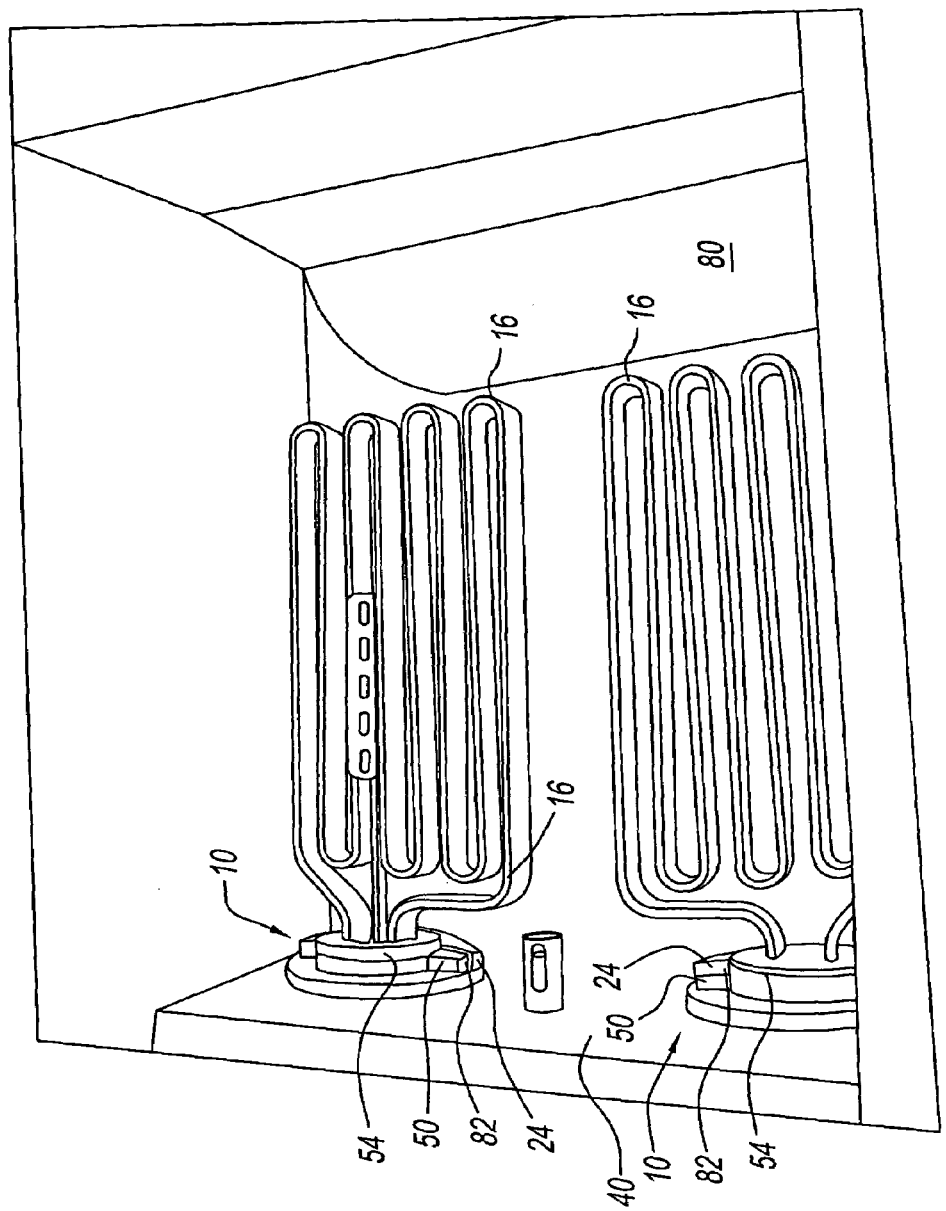
FIG. 10 is a top perspective view of a frypot having a pair of the seal assemblies of the present invention.

Referring to FIG. 10, another embodiment of the present invention is illustrated having seal assembly 10 used in electric fryers to mount a heating element 16. Seal assembly 10 allows rotation of element 16 for cleaning underneath an oil level. Shaft 14 may be connected, for example, via welding or brazing, to heating element 16 to form shaft/element assembly 54 as shown in FIGS. 8 and 9. Heating element 16 may be a firebar 56, as shown in FIG. 1, having ends connecting to shaft 14 to heat oil in the electric fryer via convection. Shaft 14 may have a probe 60. Probe 60, as shown in FIG. 1, may be installed with pipe threads or straight threads with some type of seal into shaft 14, and more preferably, into a shaft face 43 that is continuous with ridge 42. Probe 60 may be used to control oil temperature in the pot. Probe 60, preferably, is installed to maintain the same position relative to heating element 16 during rotation for properly measuring oil temperature and assisting in the UL or Underwriters Laboratories requirements for low oil testing. If oil is under heating element 16, probe 60 may detect radiant heat to deactivate the electric fryer. A tilt switch is in place to detect position of element 16 to disallow element 16 to function in the up position.

Each sealing assembly 10 of a pair, preferably, is mounted in a D-shaped mounting hole in a wall 40 of a pot 80 to position heating element 16 under an oil level, as shown in FIG. 10. Sealing assembly 10 may have a stop 82 comprised of stopper 24 and lobe 50. Preferably, stopper 24 is connected to, and more preferably integral with, an outer surface of mounting portion 20. Stopper 24 is positioned on opposing sides, and more preferably, extends about a bottom portion of mounting portion 20, as shown in FIGS. 2 and 5. Lobe 50, is connected to, and preferably integral with, an outer periphery of ridge 42, as shown in FIG. 8. The D-shaped mounting hole, stopper 24, and lobe 50 insure correct location of heating element 16 in pot 80 for proper function.

Heating element 16, preferably, is in a flat position perpendicular to wall 40 of pot 80 during use of the fryer. Stopper 24 on hub 12 and lobe 50 on shaft 14 may maintain heating element 16 in a flat position. Preferably, lobe 50 rotates with shaft/element assembly 54 in the same plane as stopper 24 such that upon contact, stopper 24 restricts further rotation of shaft/element assembly 54 from the flat position. Moreover, pot 80 may prohibit rotation of shaft/element assembly 54 when heating element 16 is rotated, preferably, to 120° relative to the flat position. Thus, shaft/element assembly 54 may be rotated from the flat position, such as, for example, to 90° to clean wall 40 that is connected with sealing assembly 10. Therefore, by rotating shaft/element assembly 54, while sealed under the oil level, large openings are removed to prevent undesirable oil migration, and the simplicity of a fixed element design is obtained providing access to clean both above and below the oil level.

This arrangement also puts wires 84, shown in FIGS. 1 and 3, of heating element 16 into a twisting versus bending motion to give wires 84 longer life. A bending motion is like a coat hanger application that would cause wires 84 to fail prematurely. Whereas, twisting action with wires 84 will last for an extremely long time.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A seal assembly comprising:
a mount that selectively rotates a heating element while preventing leakage of a liquid around or through a sealing assembly, said mount having a hub and a shaft, said hub being affixable to a mounting surface and said shaft being rotatably disposed in said hub, said hub having a tubular portion and a mounting portion extending about a periphery of a first end of said tubular portion, said shaft having a cylindrical shaft extension disposed in said tubular portion and a ridge portion positioned at least partially adjacent to said mounting portion, said sealing assembly being a first U-ring seal disposed intermediate said tubular portion and said cylindrical shaft extension and adjacent said ridge portion, and said first U-ring seal allowing said shaft to rotate while preventing leakage of said liquid through said sealing assembly; and
a first bearing disposed adjacent said first U-ring seal.

2. A fryer comprising:
a pot having an interior wall;
a heating element disposed inside said interior wall; and
a seal assembly which comprises a mount and a seal that rotationally connects said heating element to said interior wall of said pot so that said heating element selectively rotates while connected to said interior wall preventing leakage of a liquid around or through said seal assembly,
wherein said mount has a hub and a shaft, and wherein said hub is affixed to said interior wall and said shaft rotates inside of said hub, and
wherein said seal is a first U-ring seal disposed intermediate said hub and said shaft.

3. The fryer of claim 2, wherein said shaft is connected to said heating element, and wherein said heating element rotates with said shaft.

4. The fryer of claim 2, further comprising a first bearing disposed intermediate said shaft and said hub.

5. The fryer of claim 2, further comprising a second U-ring seal disposed intermediate said hub and said shaft.

6. The fryer of claim 5, further comprising a second bearing disposed intermediate said hub and said shaft adjacent to said second U-ring seal.

7. The fryer of claim 2, further comprising an o-ring intermediate said hub and said shaft.

8. The fryer of claim 2, further comprising a locknut that connects said mount to said interior wall, wherein said mount extends through said interior wall and said locknut is secured about said mount adjacent an exterior of said interior wall.

9. The fryer of claim 2, further comprising a first o-ring disposed intermediate said mount and said interior wall.

10. The fryer of claim 2, wherein said mount has a stop restricting rotation of said element.

11. The fryer of claim 2, further comprising a probe connected to said mount that controls a temperature of said liquid, and wherein said probe is in a same relative position to said heating element during rotation.

12. The fryer of claim 2, wherein said liquid is oil.

13. The fryer of claim 2, wherein said seal assembly is disposed at or below the liquid level in said pot.

14. The fryer of claim 2, wherein said seal acts as a bushing for rotation of said shaft.

15. A seal assembly comprising:
a mount that selectively rotates a heating element while preventing leakage of a liquid around or through a sealing assembly, said mount having a hub and a shaft, said hub being affixable to a mounting surface and said shaft being rotatably disposed in said hub, said hub having a tubular portion and a mounting portion extending about a periphery of a first end of said tubular portion, said shaft having a cylindrical shaft extension disposed in said tubular portion and a ridge portion positioned at least partially adjacent to said mounting portion,
wherein said sealing assembly is a first U-ring seal disposed intermediate said tubular portion and said cylindrical shaft extension and adjacent said ridge portion, and wherein said first U-ring seal allows said shaft to rotate while preventing leakage of said liquid through said sealing assembly.

16. The seal assembly of claim 15, wherein said cylindrical shaft extension has a first end opposite said ridge portion at least partially extending beyond said tubular portion, and wherein said cylindrical shaft extension has a snap ring removably connected about said first end.

17. The seal assembly of claim 15, further comprising a locknut removably secured about said tubular portion of said mount.

18. The seal assembly of claim 15, further comprising a first o-ring disposed within a first recess of said mounting portion, wherein said first recess is positioned on an outer surface opposite said tubular portion.

19. The seal assembly of claim 18, further comprising a second o-ring disposed intermediate said hub and said shaft within a second recess.

20. The seal assembly of claim 15, wherein said shaft is connected to said heating element, and wherein said heating element rotates with said shaft.

21. The seal assembly of claim 15, further comprising a second U-ring seal disposed intermediate said tubular portion and said cylindrical shaft within a third recess.

22. The seal assembly of claim 21, further comprising a second bearing disposed intermediate said tubular portion and said cylindrical shaft within said third recess adjacent to said second U-ring seal.

23. The seal assembly of claim 15, wherein said mounting portion has an interior surface having a stop that protrudes toward said ridge portion from said mounting portion into a plane, and wherein said ridge has a lobe that protrudes from an outer perimeter of said ridge and rotates with said ridge in said plane so that said stop restricts further rotation in a direction of said shaft within said mount upon contact of said lobe with said stop.

24. The seal assembly of claim 15, wherein said sealing assembly acts as a bushing for rotation of said shaft.

* * * * *